June 2, 1970     E. D. GILBERT     3,515,015
STEERABLE AERIAL INSTALLATIONS

Filed Nov. 29, 1968     2 Sheets-Sheet 2

INVENTOR
Eric Davenport Gilbert
BY
Baldwin Wight Diller & Brown
ATTORNEYS

United States Patent Office 3,515,015
Patented June 2, 1970

3,515,015
STEERABLE AERIAL INSTALLATIONS
Eric Davenport Gilbert, Essex, England, assignor to The Marconi Company Limited, London, England, a British company
Filed Nov. 29, 1968, Ser. No. 780,000
Claims priority, application Great Britain, Jan. 26, 1968, 4,212/68
Int. Cl. F16h *1/28;* B61l *3/00;* F16c *17/06*
U.S. Cl. 74—802   12 Claims

ABSTRACT OF THE DISCLOSURE

A steerable tracking aerial including a journal bearing having an inner member supported on arcuately spaced bearing pads within an outer member. The outer member is built of segments so arranged and constructed that one of them can be removed while still leaving the inner member supported within the outer member.

---

This invention relates to steerable aerial installations, i.e. installations for aerials which are required to move so as to track desired targets.

Steerable aerials of the kind in which movement occurs in both elevation and azimuth are used in communication systems and satellite tracking. Such aerials are usually bulky and heavy, causing considerable stresses to be imposed on moving parts and particularly on the bearings employed. Furthermore such aerials often have to be operated in high winds, and this adds to the stresses imposed on the bearings and driving gear required to effect movement of the aerial. The driving gear for azimuth rotation commonly employs teeth formed on the outer member of an azimuth journal bearing. It is not uncommon for bearings to break down or driving teeth to break off the outer periphery of a bearing as the result of the stresses occurring in high winds. Because such a bearing is usually large and heavy—typically of the order of 16′ diameter and 8 tons weight—to replace one after a breakdown is a lengthy and difficult operation usually involving jacking up the whole aerial off its support mount and locking it to the support mount so that it will withstand any high winds which may occur whilst the broken bearing is being lifted out and replaced. Such an operation can, and often does, take weeks and during which time aerial is out of use and what may be an important communication link is broken.

The present invention seeks to avoid the above difficulties.

According to this invention a steerable aerial installation includes a journal bearing having an inner member supported within an outer member which is built up of segments so arranged and constructed that one of them can be removed while still leaving the inner member supported within the outer member.

Preferably the inner member is supported within the outer member by intermediate bearing means.

Preferably the intermediate bearing means comprise a plurality of arcuately spaced bearing pads carried on the inner member, and the inner surface of the outer member is shaped to constitute a co-operating bearing surface.

In a modification the intermediate bearing means comprise a plurality of arcuately spaced bearing pads carried on the outer member and the outer surface of the inner member shaped to constitute a co-operating bearing surface.

Preferably the bearing pads are so arranged that the angular spacing between at least two adjacent arcuately spaced pads is greater than the angle subtended by a removable segment of the outer bearing member.

Preferably again the bearing pads are mounted in pairs on the inner member, the pads of each pair being relatively closely spaced arcuately with the same arcuate spacing and the arcuate spacing between any pad of any pair and the nearer pad of the next pair being by an angle which is greater than the angle subtended by one removable segment of the outer bearing member. Thus by suitably rotating the inner bearing member a segment of the outer member may be removed without disturbing any of the bearing pads.

Preferably each bearing pad is pinned at one end to the member which carried it and supported from said member by a self-aligning spherical ball unit provided intermediately along the length of the bearing pad, an adjustable stop bearing upon said member being provided at the other end of the bearing pad.

Preferably the bearing pads are so mounted on the inner member as to be dismountable without removing a segment of the outer member.

In a preferred construction the bearing pads are provided in duplication, the two pads of each duplication being spaced in the axial direction and being adjustable in position in the axial direction whereby the area of contact of the bearing pads upon the co-operating bearing surface may be changed. Thus when one area of contact upon said bearing surface becomes worn a fresh area of contact may be brought into service.

Among the many different materials which are suitable for the bearing pads are sintered bronze, ceramic, P.T.F.E. and the material known under the trade name "Ferrobestos."

In a preferred construction the inner member forms part of the steerable structure of the aerial and is driven by means of a planet and sun wheel gear arrangement, the planet wheel being driven and carried by part of the steerable structure and the sun wheel being provided by peripheral teeth on the outer surface of the outer member.

Preferably the inner member is a triangulated structure with three pairs of bearing pads mounted one each side of each apex, the angular distance between each pad of one pair and the nearer pad of the next pair is substantially 90° and the outer member is composed of four segments each subtending an angle of substantially 90°. With this construction it is preferable to provide the bearing pads on opposite sides of the same apex with leading edges on opposite ends to allow for rotation in both directions.

Preferably means are provided for heating the inner member and for automatically controlling said heating in dependence upon the spacing of said member from the outer member so as to maintain said spacing substantially constant at a predetermined value. Preferably the means for controlling the heating includes means for monitoring the electrical capacity between the inner and outer members. Where the inner member is a triangulated structure the heat may be applied to one arm only of the structure. The heat is preferably applied to the inner member by means of heating elements inserted in hollow tubing forming part of the structure.

The invention is illustrated in the accompanying drawings in which.

Figure 1:
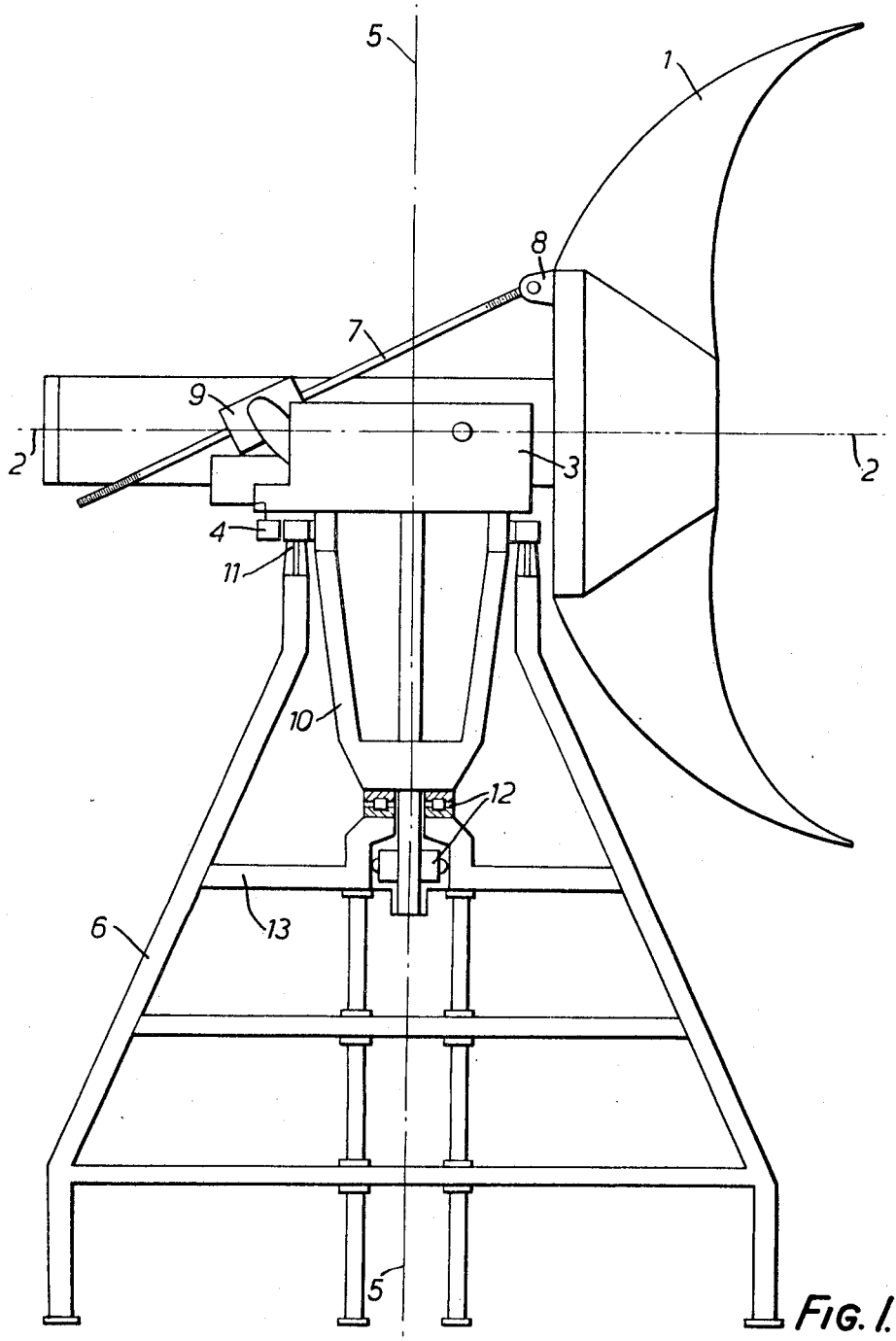
FIG. 1 is a general diagrammatic side elevation of one form of steerable aerial installation in accordance with the present invention.

Referring to FIG. 1, 1 is an aerial pivoted about an elevation axis 2 of a support member 3 which is driven through gearing 4 (by means not shown) about an azimuth axis 5 of a fixed tower 6. The movement of the aerial 1 about the elevation axis 2 is provided by a jack arrangement consisting of a screw 7 connected by a trunnion 8 at one end to the aerial 1, and a nut member 9 which is on the screw 7 and is rotatable through suitable reduction gear and an elevation motor (not shown). As will be apparent when the nut member is rotated by the motor the screw 7 is moved endwise and the aerial 1 is moved in elevation.

The support member 3 is carried on a rotatable tripod mount 10 at one end of which (upper end in the drawing) a journal bearing 11 couples the azimuth driving gear 4 to the tripod mount 10 and at the other end of which (lower end in the drawing) a combined thrust and journal bearing 12 supports the aerial on a stay 13 of the fixed tower 6.

Figure 2:
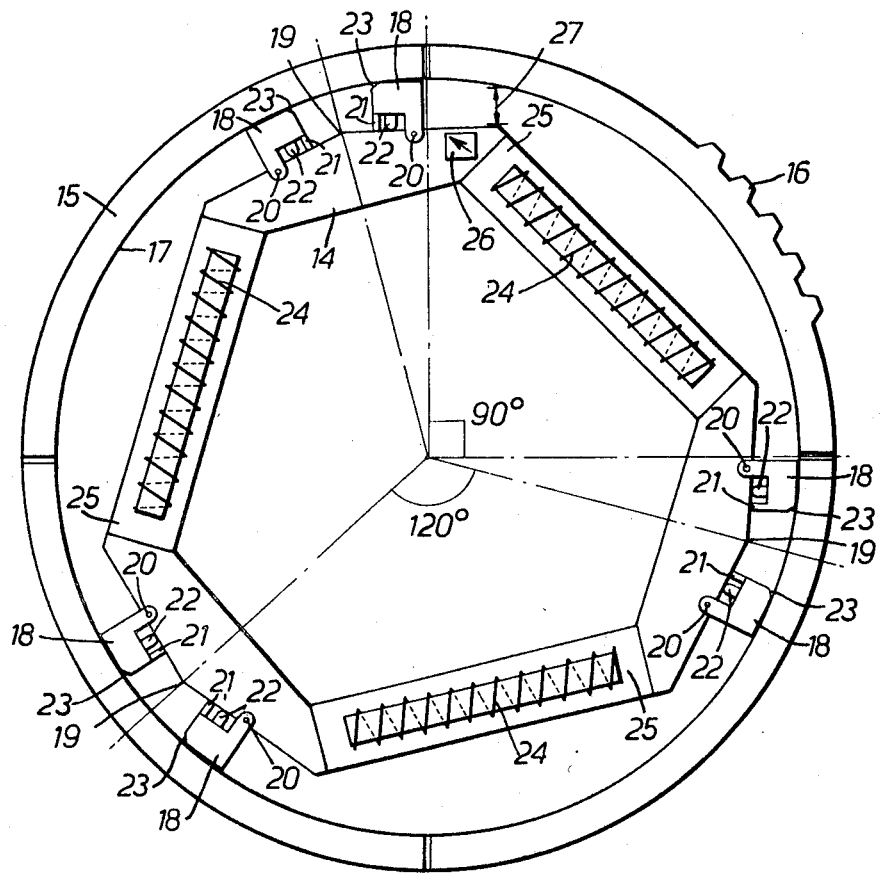
FIG. 2 is a diagrammatic plan view of a journal bearing used in the installation of FIG. 1, and FIGS. 3a and 3b are diagrammatic views illustrating the mounting of a pair of bearing pads used in the bearing shown in FIG. 2.

Referring to FIG. 2, the journal bearing consists of a regular triangulated inner member 14 and an outer ring member 15. The outer member 15 is split into four segments, each extending through 90°, and is provided with a bearing surface 17 on its inner surface and teeth 16 on its outer surface (only a few of which are shown for convenience of drawing) thus forming the sun wheel of a sun and planet gear arrangement. This wheel engages with the azimuth drive gearing 4 (see FIG. 1) which forms the planet wheel. The regular triangulated inner member 14 is supported within the outer member 15 by bearing pads 18 on each side of the apices 19 (arranged on 120° centres) of the regular triangulated inner member 14. The bearing pads 18 are pinned at one end 20 to the inner member 14 and supported at their other end on an adjustable stop 21 which may be controlled by cam operated means (not shown) to adjustably bear on the inner member 14. The bearing pads 18 are made self-aligning by a spherical ball unit diagrammatically indicated at 22. The bearing pads on opposite sides of the apices 19 have leading edges 23 at opposite ends to allow for either direction of azimuth rotation of the aerial.

Heater means 24 are provided within hollow arms 25 of the regular triangulated structure to heat the inner member 14. The heat applied causes the inner member 14 to expand and close the spacing between the inner and outer members 14 and 15 respectively.

The heater means 24 are controlled by a capacitance monitor 26 which regulates them in dependence on the electrical capacity of an air gap 27 between the inner and outer members 14 and 15 respectively in the region of the bearing pads 18.

Figure 3A:
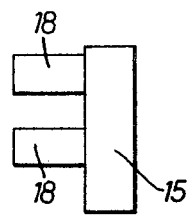
Figure 3B:
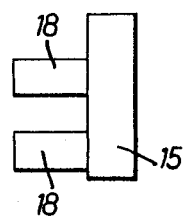

FIGS. 3a and 3b show pairs of bearing pads 18 in two different positions in relation to the bearing surface of the outer member 15. In the event of the bearing surface of the pads in FIG. 3a being worn, the pads may be disconnected and moved to the alternative position shown in FIG. 3b when they may be reconnected for example by pinning them to the support member.

A member of materials are suitable for the bearing pads. These include sintered bronze, ceramic material, P.T.F.E. and the material known under the trade name "Ferrobestos."

It should be noted that with aerials constructed in accordance with the present invention all repairs to the bearings may be made without removing the complete bearings from the aerial. In particular if one or more teeth were to break off the outer member, instead of dismantling and replacing the complete bearing (as would be the case with previous aerials) it is only necessary to rotate the aerial until all of the bearing pads are encompassed within the sound part of the segmented outer member carrying the broken teeth. Furthermore, since the remaining segments support the aerial, it is no longer necessary to take special locking precautions. In addition should one of the bearing pads break down, once again it is no longer necessary to replace the complete bearing but merely to disconnect the broken bearing pad, slide it out from between the inner and outer member, and replace it.

I claim:

1. A steerable aerial installation including a journal bearing having an inner member supported within an outer member which is built up of segments so arranged and constructed that one of them can be removel while still leaving the inner member supported within the outer member.

2. An installation as claimed in claim 1 wherein the inner member is supported within the outer member by intermediate bearing means.

3. An installation as claimed in claim 2 wherein the intermediate bearing means comprise a plurality of arcuately spaced bearing pads carried on the outer member and the outer surface of the inner member shaped to constitute a co-operating bearing surface.

4. An installation as claimed in claim 2 wherein the intermediate bearing means comprise a plurality of arcuately spaced bearing pads carried on the inner member and the inner surface of the outer member is shaped to constitute a co-operating bearing surface.

5. An installation as claimed in claim 4 wherein the bearing pads are so arranged that the angular spacing between at least two adjacent arcuately spaced pads is greater than the angle subtended by a removable segment of the outer bearing member.

6. An installation as claimed in claim 5 wherein the bearing pads are mounted in pairs on the inner member the pads of each pair being relatively closely spaced arcuately with the same arcuate spacing and the arcuate spacing between any pad of any pair and the nearer pad of the next pair being by an angle which is greater than the angle subtended by one removable segment of the outer bearing member.

7. An installation as claimed in claim 6 wherein each bearing pad is pinned at one end to the member which carries it and supported from said member by a self-aligning spherical ball unit provided intermediately along the length of the bearing pad, an adjustable stop bearing upon said member being provided at the other end of the bearing pad.

8. An installation as claimed in claim 7 wherein the bearing pads are provided in duplication, the two pads of each duplication being spaced in the axial direction and being adjustable in position in the axial direction whereby the area of contact of the bearing pads upon the co-operating bearing surface may be changed.

9. An installation as claimed in claim 8 wherein the inner member forms part of the steerable structure of the aerial and is driven by means of a planet and sun wheel gear arrangement, the planet wheel being driven and carried by part of the steerable structure and the sun wheel being provided by peripheral teeth on the outer surface of the outer member.

10. An installation as claimed in claim 9 wherein the inner member is a triangulated structure with three pairs of bearing pads mounted one on each side of each apex, the angular distance between each pad of one pair and the nearer pad of the next pair is substantially 90° and the outer member is composed of four segments each subtending an angle of substantially 90°.

11. An installation as claimed in claim 10 wherein means are provided for heating the inner member and for automatically controlling said heating in dependence upon the spacing of said member from the outer member so as to maintain said spacing substantially constant at a predetermined value.

12. An installation as claimed in claim 11 wherein the means for controlling the heating includes means for monitoring the electrical capacity between the inner and outer members.

References Cited

UNITED STATES PATENTS

| | | | |
|---|---|---|---|
| 2,814,038 | 11/1957 | Miller | 343—757 |
| 2,907,031 | 9/1959 | Meredith | 343—757 |
| 3,059,889 | 11/1962 | Pottmeyer | 248—183 |

FOREIGN PATENTS 795,669  5/1958  Great Britain.

LEONARD H. GERIN, Primary Examiner

U.S. Cl. X.R.

248—179, 183; 308—73; 343—766